US012791499B2

(12) United States Patent
Asadi-Zanjani et al.

(10) Patent No.: US 12,791,499 B2
(45) Date of Patent: Nov. 10, 2026

(54) X-RAY COMPATIBILITY METRIC FOR DESIGN-FOR-INSPECTION OF INTEGRATED CIRCUIT PACKAGES

(71) Applicant: University of Florida Research Foundation, Incorporated, Gainesville, FL (US)

(72) Inventors: Navid Asadi-Zanjani, Gainesville, FL (US); Mohammad Shafkat Khan, Gainesville, FL (US); Hamed Dalir, Gainesville, FL (US); Aslam Khan, Gainesville, FL (US); Nitin Varshney, Gainesville, FL (US); Chengjie Xi, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 142 days.

(21) Appl. No.: 18/796,672

(22) Filed: Aug. 7, 2024

(65) Prior Publication Data

US 2025/0085240 A1 Mar. 13, 2025

Related U.S. Application Data

(60) Provisional application No. 63/582,053, filed on Sep. 12, 2023.

(51) Int. Cl.
*G01N 23/18* (2018.01)
*G01N 23/04* (2018.01)

(52) U.S. Cl.
CPC ............. *G01N 23/18* (2013.01); *G01N 23/04* (2013.01)

(58) Field of Classification Search
CPC ............................... G01N 23/18; G01N 23/04
See application file for complete search history.

(56) References Cited

U.S. PATENT DOCUMENTS

| | | | | |
|---|---|---|---|---|
| 2014/0103344 | A1* | 4/2014 | Tehranipoor | G01R 31/31725 257/48 |
| 2018/0293721 | A1* | 10/2018 | Gupta | G06T 7/001 |
| 2021/0010953 | A1* | 1/2021 | Adler | G01T 1/20 |
| 2021/0010954 | A1* | 1/2021 | Adler | G01T 1/20 |
| 2021/0011177 | A1* | 1/2021 | Adler | G01T 1/20 |
| 2024/0061402 | A1* | 2/2024 | Mori | G05B 19/4155 |
| 2024/0264539 | A1* | 8/2024 | Lu | G03F 7/70616 |
| 2025/0117921 | A1* | 4/2025 | Ilievska Alcheva | G06F 18/217 |

* cited by examiner

*Primary Examiner* — Hugh Maupin
(74) *Attorney, Agent, or Firm* — Alston & Bird LLP

(57) ABSTRACT

A method and system that are directed to determining compatibility of integrated circuit (IC) packages with X-ray inspection. The method comprises determining one or more packaging specifications and one or more imaging specifications, generating an X-ray discernability model based on one or more X-ray image samples and one or more X-ray simulations, determining, using the X-ray discernability model, one or more threshold values of one or more DFI parameters that are associated with a target IC package type, assigning one or more compatibility scores to the one or more DFI parameters based on a comparison between one or more test DFI parameter values that are associated with a test IC package design and the one or more threshold values, and generating an X-ray compatibility metric based on the one or more compatibility scores.

20 Claims, 12 Drawing Sheets

X-RAY COMPATIBILITY METRIC FOR DESIGN-FOR-INSPECTION OF INTEGRATED CIRCUIT PACKAGES

CROSS REFERENCE TO RELATED APPLICATION

This application claims the priority of U.S. Provisional Application No. 63/582,053, entitled "X-RAY COMPATIBILITY METRIC FOR DESIGN-FOR-INSPECTION OF INTEGRATED CIRCUIT PACKAGES," filed on Sep. 12, 2023, the disclosure of which is hereby incorporated by reference in its entirety.

TECHNICAL FIELD

Various embodiments of the present disclosure relate to semiconductor manufacturing, and more particularly to X-ray-based inspection of integrated circuit packages.

BACKGROUND

Innovations in packaging technology have greatly progressed through aggressive innovations and interconnect scaling playing a more important role in the semiconductor industry. As semiconductor technologies move to continuous scaling (greater than Moore's law) and alternative technologies (to surpass Moore's law), packaging solutions may be pushed to balance between lower costs, less power consumption, and increased performance. As a result, single solution solutions have given way to application-specific customization in packaging technologies. For example, flip-chip, three-dimensional integrated circuit (3DIC), and system-in-package (SIP) solutions were created as a result of advancements in packaging technologies in combination with chip-scale packaging (CSP) and multi-die stacking techniques. While package-on-package packaging and flip-chip CSP are popular approaches, new techniques, such as embedded die and fan-out wafer level packaging are gaining in popularity.

A major area of interest is the interconnect level between die-to-die and/or die-to-substrate interfaces in order to implement various packaging technologies while ensuring good reliability and long life. Shrinking interconnect dimensions, decreasing feature pitch, and thinner material layers have resulted in constant adaptation of the redistribution layer and the introduction of new interconnect architectures such as through-silicon vias (TSVs) and micro bumps (or bumps). Furthermore, back-end-of-line (BEOL) techniques have grown in complexity to bridge the gap between fast-scaling transistors and slower-shrinking interconnects. As a result, current BEOL stacks may have more than ten metal layers with multiple micrometer-thick chip-packaging interaction (CPI) features, whereas TSV and bump structures have been reduced from hundreds to tens and even single-digit micrometers in feature size. However, analyzing complex products using the aforementioned technologies, and determining root causes for failing behavior, such as packaging design and manufacturing procedures, have become increasingly difficult. With opposite scaling trends for BEOL and interconnect level, a clear separation between both is diminishing, which leads to a blurred line between die-level and package-level defect categories. Additional trends such as larger die size, reduced package thickness, and new material introduction in combination with 2.5D or 3D interconnect architecture may also present significant new challenges to existing failure analysis (FA) techniques.

Non-destructive methods may be used to localize defects and faults within complex structures in integrated circuits (IC) packaging FA by keeping the complex structures functionally intact for other tests. For example, non-destructive methods such as X-ray microscopy, scanning acoustic microscopy (SAM), time domain reflectometry (TDR), and terahertz (THz)-time domain spectroscopy (TDS) may reveal the internal structure of a device, allowing for precise identification of failure locations and mechanisms. However, the continuing evolution of 3D architectures, combined with decreasing pitch in printed circuit board (PCB), substrate, and package interconnect (e.g., micro bumps, redistribution layers (RDL)) are driving new approaches to achieve timely product releases and migration to high volume manufacturing. X-ray microscope (XRM) is continuing to grow in importance as the electronics industry develops more complex and integrated structures across all levels of the supply chain. XRM systems may achieve extremely high resolutions for advanced packaging interconnects. Other nondestructive methods, such as SAM or THz, which may have low source energy, are able to penetrate through the layers of advanced packaging but may lead to lower signal-to-noise ratios and may require additional sample preparation to remove excess materials and detect buried failure locations.

3D X-ray systems may use a combination of many techniques to revamp traditional approaches used in imaging semiconductor packages, PCBs, and wafers to submicron resolution. For example, a Sigray APEX-150 system may comprise an architecture that uses a high flux source, a high efficiency detector, and software algorithm, where 0.5 μm voxel acquisition time may be completed in as little as 3-5 minutes in any part of a package, board, or 300 mm wafer. A 3D X-ray system architecture may enable imaging of a region of interest (ROI) in a large object e.g., PCB and 300 mm wafer, with a very small distance to the X-ray source. The Sigray APEX-150 system may be capable of resolving the features of 3-micron diameter TSVs and 6-micron Sn(Ag) micro bumps on a 300 mm wafer using 3D imaging in under 2 minutes per field of view (FOV).

However, shrinking feature sizes in printed circuit board assemblies (PCBAs) and heterogenous integration (HI) structures have presented challenges for advanced X-ray inspection methods. Inspection capability and metrology of advanced packages are being pushed to limits due to aggressive feature scaling and performance enhancement. As such, package structural analysis may become more critical in the development of emerging packages. The trends towards dense and 3D structures in advanced packaging and heterogeneous integration are outpacing failure analysis (FA) advancements. Current failure isolation and analysis modalities are struggling to improve resolution, contrast, signal to noise ratio, for example, at the same pace of packaging advances, and thus creating a widening gap. Given that technology is heading toward more complex packaging methods with shrinkage in feature size and in complexity, it may be vital in contemporary semiconductor manufacturing to be able to forecast an integrated circuit (IC) package's compatibility to X-ray-based inspection in the pre-silicon stage.

BRIEF SUMMARY

Various embodiments described herein relate to methods, apparatuses, and systems for determining compatibility of integrated circuit (IC) packages with X-ray inspection.

According to one embodiment, a method comprises determining, by one or more processors, one or more packaging specifications and one or more imaging specifications; generating, by the one or more processors, an X-ray discernability model based on one or more X-ray image samples and one or more X-ray simulations; determining, by the one or more processors and using the X-ray discernability model, one or more threshold values of one or more design-for-inspection (DFI) parameters that are associated with a target IC package type; assigning, by the one or more processors, one or more compatibility scores to the one or more DFI parameters based on a comparison between one or more test DFI parameter values that are associated with a test IC package design and the one or more threshold values; and generating, by the one or more processors, an X-ray compatibility metric based on the one or more compatibility scores.

In some embodiments, the X-ray compatibility metric is associated with a discernability of fine-pitched features in chip packages during X-ray inspection. In some embodiments, the one or more packaging specifications and the one or more imaging specifications comprise material composition, X-ray energy, detector specifications, sample orientation, and packaging configurations. In some embodiments, the one or more DFI parameters represent parameters affecting discernability of fine-pitched features in chip packages during X-ray inspection. In some embodiments, the X-ray compatibility metric is usable for (i) integration with an integrated (IC) chip design and simulation workflow or (ii) optimizing the IC chip design for enhanced discernability of fine-pitched features associated with X-ray inspection feasibility.

In some embodiments, the one or more packaging specifications are associated with the target IC package type. In some embodiments, the one or more DFI parameters define dimensions and spacings between a plurality of structures in an IC package. In some embodiments, the plurality of structures comprises micro-bumps, redistribution layers, metal interconnects, or through-silicon vias. In some embodiments, generating the X-ray discernability model comprises gathering and analyzing one or more X-ray image samples of one or more sample IC packages and one or more X-ray simulations associated with the one or more sample IC packages. In some embodiments, the one or more X-ray simulations comprise interactions of X-rays with a 3D model of the one or more sample IC packages within a simulation environment. In some embodiments, the test IC package design comprises the target IC package type. In some embodiments, the method further comprises assigning the one or more compatibility scores to the one or more DFI parameters based on a degree of compliance to the one or more threshold values by the one or more test DFI parameter values. In some embodiments, the X-ray compatibility metric comprises a weighted average sum of the one or more compatibility scores.

According to one embodiment, a computing system comprises memory and one or more processors communicatively coupled to the memory. In some embodiments, the one or more processors are configured to determine one or more packaging specifications and one or more imaging specifications; generate an X-ray discernability model based on one or more X-ray image samples and one or more X-ray simulations; determine, using the X-ray discernability model, one or more threshold values of one or more DFI parameters that are associated with a target IC package type; assign one or more compatibility scores to the one or more DFI parameters based on a comparison between one or more test DFI parameter values that are associated with a test IC package design and the one or more threshold values; and generate an X-ray compatibility metric based on the one or more compatibility scores.

In some embodiments, the one or more packaging specifications and the one or more imaging specifications comprise material composition, X-ray energy, detector specifications, sample orientation, and packaging configurations. In some embodiments, the one or more DFI parameters represent parameters affecting discernability of fine-pitched features in chip packages during X-ray inspection. In some embodiments, the one or more packaging specifications are associated with the target IC package type. In some embodiments, the one or more DFI parameters define dimensions and spacings between a plurality of structures in an IC package. In some embodiments, the plurality of structures comprises micro-bumps, redistribution layers, metal interconnects, or through-silicon vias.

According to one embodiment, one or more non-transitory computer-readable storage media include instructions that, when executed by one or more processors, cause the one or more processors to determine one or more packaging specifications and one or more imaging specifications; generate an X-ray discernability model based on one or more X-ray image samples and one or more X-ray simulations; determine, using the X-ray discernability model, one or more threshold values of one or more DFI parameters that are associated with a target IC package type; assign one or more compatibility scores to the one or more DFI parameters based on a comparison between one or more test DFI parameter values that are associated with a test IC package design and the one or more threshold values; and generate an X-ray compatibility metric based on the one or more compatibility scores.

BRIEF DESCRIPTION OF THE DRAWINGS

Embodiments incorporating teachings of the present disclosure are shown and described with respect to the figures presented herein.

DETAILED DESCRIPTION

Figure 1:
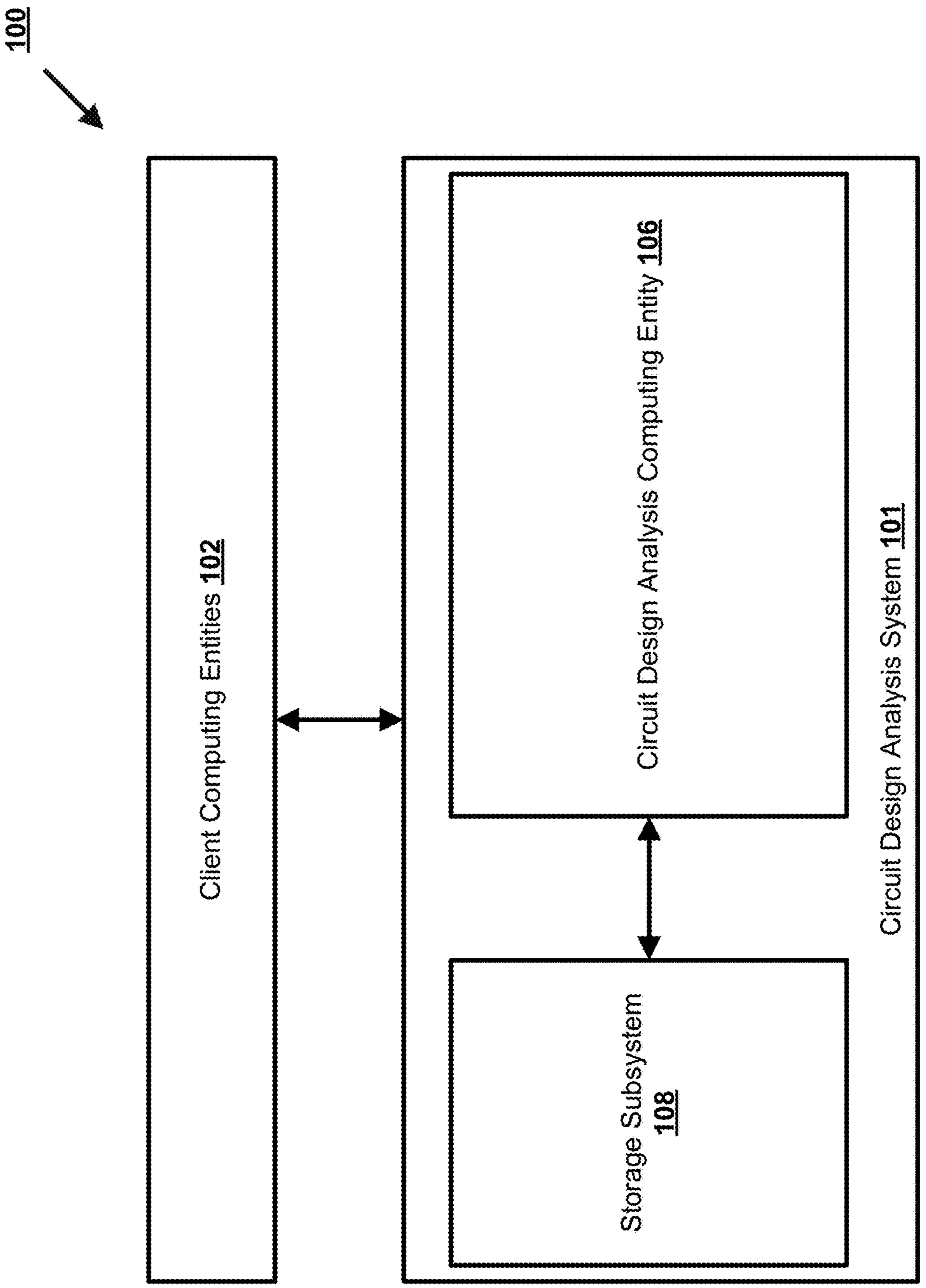
FIG. 1 illustrates an example overview of an architecture that may be used to practice embodiments of the present disclosure.

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

General Overview and Example Technical Improvements

The present disclosure provides a system and method for determining X-ray inspection compatibility of IC package designs by generating X-ray compatibility metrics for the IC package designs, which may aid chip designers in estimating how well fine-pitched features in advanced chip packages may be discerned using advanced X-ray inspection, for example, in the pre-silicon stage.

X-ray imaging-based post-silicon validation may be an invaluable tool for examining internal structures and integrity of integrated circuits and advanced packages. By capturing X-ray images at different angles, three-dimensional reconstructions of IC packages or devices may be generated. Techniques such as X-ray laminography and tomography are an integral part of a post-silicon validation process. The advantages of X-ray imaging for post-silicon validation lie in its non-destructive nature and its ability to provide detailed internal views of complex assemblies. With high-resolution X-ray systems, it becomes feasible to visualize a multitude of complexity that are packed into the advanced IC packages, including heterogeneous system-in-packages (SiP) comprising multiple dies assembled in a single package. Fault isolation, metrology of inner layers of integrated circuits, inspection of the alignment of stacked components, and assessment of the overall integrity of the assembly are some of the capabilities that are offered by X-ray imaging.

The ability to predict the compatibility of an integrated circuit (IC) package to X-ray-based inspection in the pre-silicon stage may be crucial in modern semiconductor manufacturing, since technology is moving towards more advanced packaging technologies with the advent of heterogeneous integration. In particular, the effectiveness of X-ray inspection may be heavily influenced by feature size of a circuit's design and its level of complexity. The intricate, densely packed, and noise-inducing features in an advanced IC package such as micro-bumps, TSVs, RDLs, etc., may hinder the process of image acquisition using X-ray tomography or laminography. Moreover, miniaturization and high-density integration of advanced packaging technologies result in smaller feature sizes and closer proximity between intricate arrangements of such features, which may lead to overlapping or obscured details, complicating the interpretation of X-ray inspection results. Furthermore, the presence of noise-inducing factors, such as scattered X-ray radiation or artifacts caused by material interfaces, may further impede the image acquisition process. Noise sources may introduce unwanted signals or distortions that may hinder identification and localization of defects or faults within an IC package.

According to various embodiments of the present disclosure, an X-ray compatibility metric may be generated for quantifying X-ray inspection compatibility of IC packages in a semiconductor packaging design and manufacturing flow. The disclosed X-ray compatibility metric may fill a critical gap by providing designers with a quantifiable estimation of how well fine-pitched features of designs may be discerned through X-ray inspection. In some embodiments, the disclosed X-ray compatibility metric may be generated by gathering and analyzing X-ray imaging data, and performing simulations to assess various design factors, enabling designers to make data-driven decisions and optimize designs for successful inspection outcomes. For example, by predicting the compatibility with X-ray inspection using the disclosed X-ray compatibility metric, designers may identify potential sources of noise scattering, or regions of unresolvable spacings such that necessary adjustments may be made before a fabrication process. By providing an early assessment, a design's manufacturability may be optimized, reducing the likelihood of costly re-designing, and shortening time-to-market. Integration of the disclosed X-ray compatibility metric into the pre-silicon stage may offer a proactive and systematic approach to address X-ray inspection challenges and enhance the overall reliability and production yield.

As disclosed herewith, embodiments of the present disclosure address a critical aspect of modern semiconductor manufacturing by predicting the compatibility of integrated circuit (IC) packages with X-ray-based inspection, e.g., in the pre-silicon stage. In some embodiments, an X-ray compatibility metric may estimate how well fine-pitched features in advanced IC packages may be discerned through X-ray inspection. Chip designers provided with an X-ray compatibility metric may be able to make informed decisions and optimize their designs to enhance compatibility with X-ray inspection techniques. The disclosed X-ray compatibility metric may streamline IC design process, reducing the risk of compatibility issues and optimizing inspection workflows.

Example Technical Implementation of Various Embodiments

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to example operations, steps, processes, blocks, and/or the like. Thus, it should be understood that each operation, step, process, block, and/or the like may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

Example System Architecture

FIG. 1 is a schematic diagram of an example architecture 100 for analyzing compatibility of IC packages with X-ray-based inspection. The architecture 100 includes a circuit design analysis system 101 configured to receive circuit design analysis requests from client computing entities 102, process the circuit design analysis requests to generate X-ray compatibility metrics corresponding to the circuit design analysis requests, and provide the generated X-ray compatibility metrics to the client computing entities 102.

In some embodiments, circuit design analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The circuit design analysis system 101 may include a circuit design analysis computing entity 106 and a storage subsystem 108. The circuit design analysis computing entity

106 may be configured to receive circuit design analysis requests from client computing entities 102, process the circuit design analysis requests to generate X-ray compatibility metrics corresponding to the circuit design analysis requests, and provide the generated X-ray compatibility metrics to the client computing entities 102.

The storage subsystem 108 may be configured to store input data used by the circuit design analysis computing entity 106 to perform circuit design analysis. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Example Data Analysis Computing Entity

Figure 2:
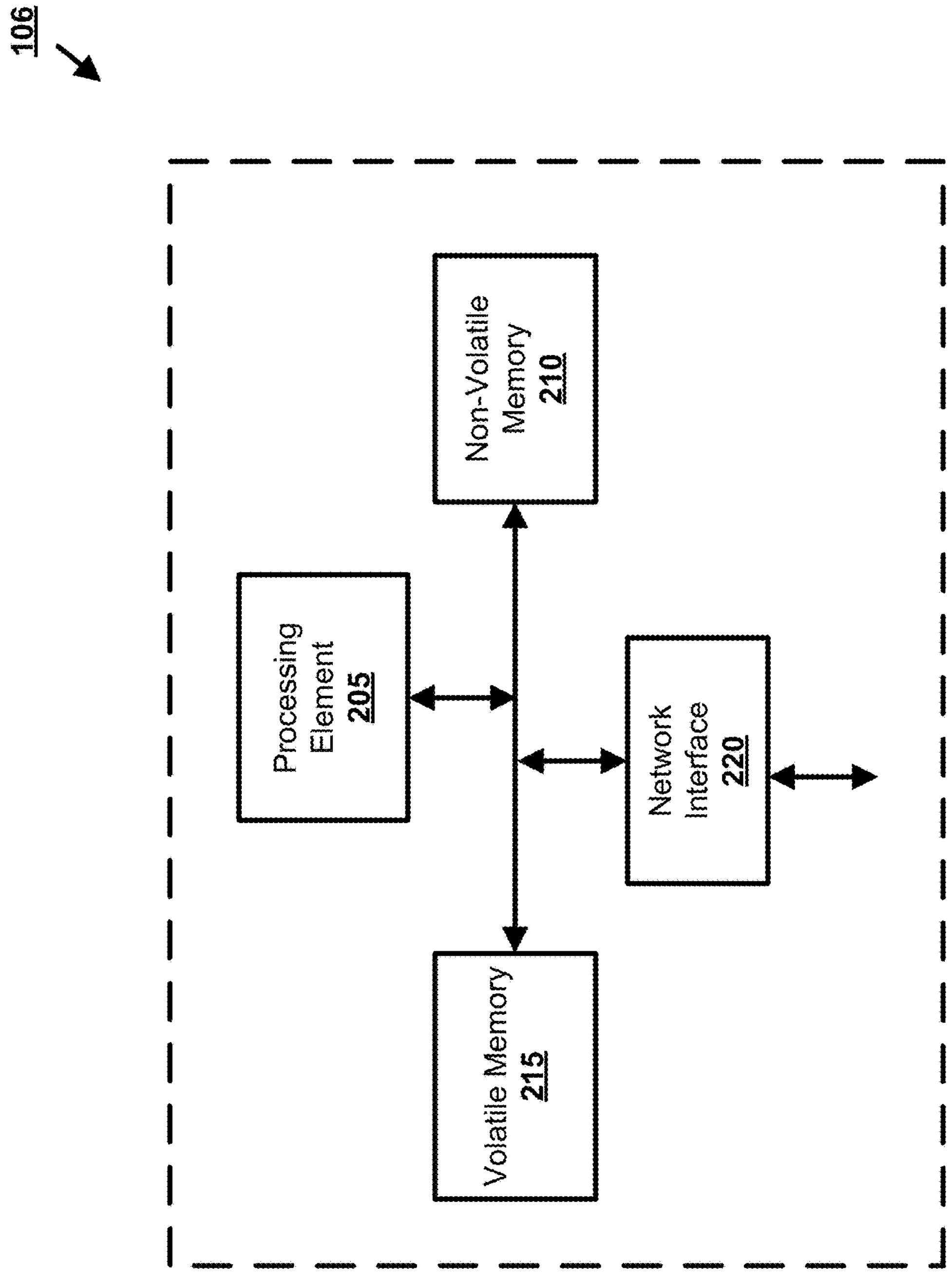
FIG. 2 illustrates an example circuit design analysis computing entity in accordance with some embodiments discussed herein.

FIG. 2 provides a schematic of a circuit design analysis computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes may be performed on data, content, information, and/or similar terms used herein interchangeably.

As indicated, in one embodiment, the circuit design analysis computing entity 106 may also include one or more network interfaces 220 for communicating with various computing entities, such as by communicating data, content, information, and/or similar terms used herein interchangeably that may be transmitted, received, operated on, processed, displayed, stored, and/or the like.

As shown in FIG. 2, in one embodiment, the circuit design analysis computing entity 106 may include, or be in communication with, one or more processing elements 205 (also referred to as processors, processing circuitry, and/or similar terms used herein interchangeably) that communicate with other elements within the circuit design analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the circuit design analysis computing entity 106 may further include, or be in communication with, non-volatile media (also referred to as non-volatile storage, memory, memory storage, memory circuitry, and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the circuit design analysis computing entity 106 may further include, or be in communication with, volatile media (also referred to as volatile storage, memory, memory storage, memory circuitry, and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the circuit design analysis computing entity 106 with the assistance of the processing element 205 and operating system.

As indicated, in one embodiment, the circuit design analysis computing entity 106 may also include one or more network interfaces 220 for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the circuit design analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the circuit design analysis computing entity 106 may include, or be in communication with, one or more input elements, such as a keyboard input, a mouse input, a touch screen/display input, motion input, movement input, audio input, pointing device input, joystick input, keypad input, and/or the like. The circuit design analysis computing entity 106 may also include, or be in communication with, one or more output elements (not shown), such as audio output, video output, screen/display output, motion output, movement output, and/or the like.

Example Client Computing Entity

Figure 3:
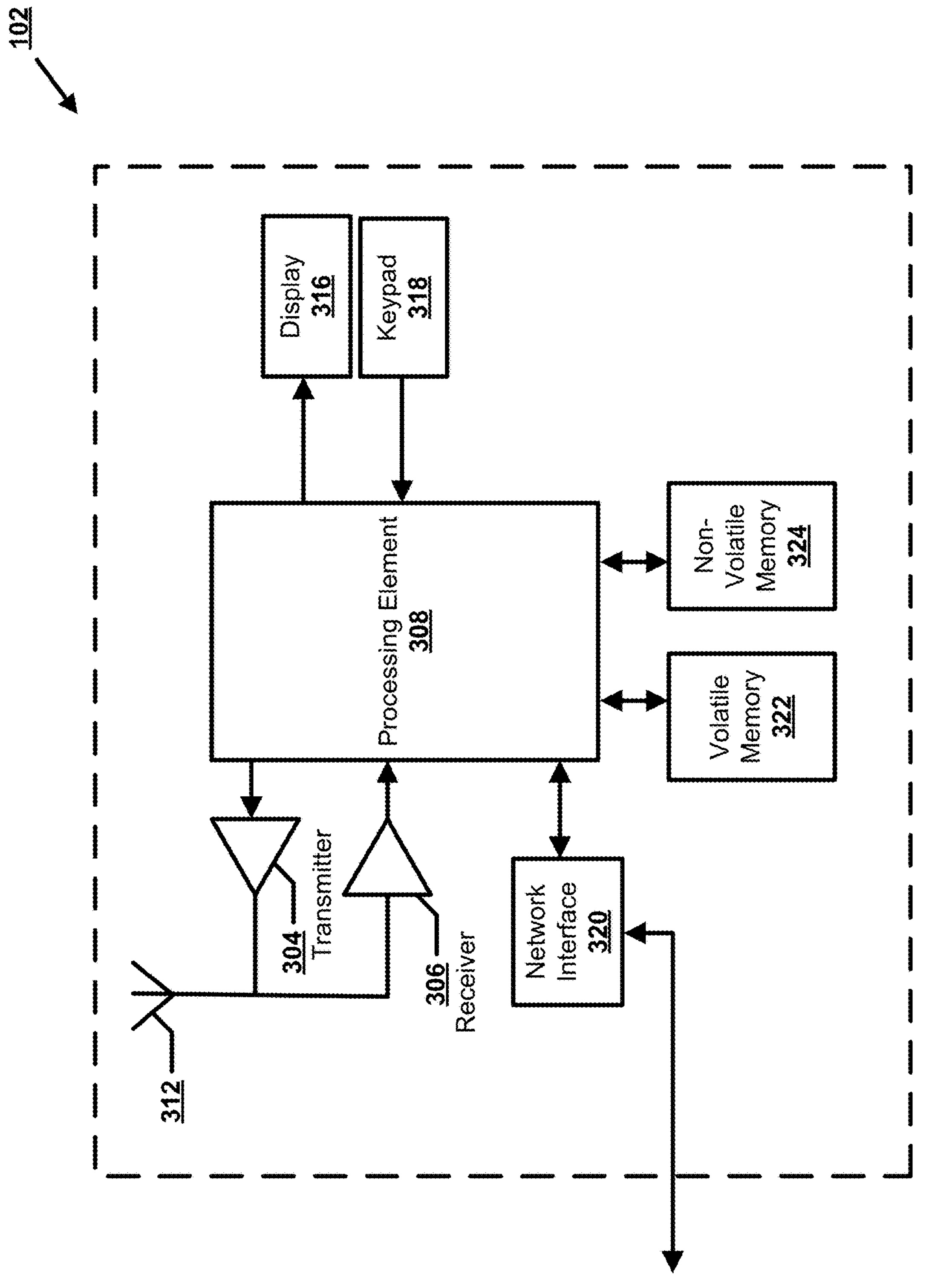
FIG. 3 illustrates an example client computing entity in accordance with some embodiments discussed herein.

FIG. 3 provides an illustrative schematic representative of a client computing entity 102 that may be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 may be operated by various parties. As shown in FIG. 3, the client computing entity 102 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the circuit design analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the circuit design analysis computing entity 106 via a network interface 320.

Via these communication standards and protocols, the client computing entity 102 may communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 may also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The client computing entity 102 may also comprise a user interface (that may include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the circuit design analysis computing entity 106, as described herein. The user input interface may comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 may include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client computing entity 102 may also include volatile storage or memory 322 and/or non-volatile storage or memory 324, which may be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the client computing entity 102 or accessible through a browser or other user interface for communicating with the circuit design analysis computing entity 106 and/or various other computing entities.

In another embodiment, the client computing entity 102 may include one or more components or functionality that are the same or similar to those of the circuit design analysis computing entity 106, as described in greater detail above. As will be recognized, these architectures and descriptions are provided for exemplary purposes only and are not limited to the various embodiments.

In various embodiments, the client computing entity 102 may be embodied as an artificial intelligence (AI) computing entity. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Factors Affecting X-Ray Compatibility

Advance packaging techniques, specifically HI, may employ multiple packaging technologies, including 2.5D and 3D integration, system-in-package (SIP), hybrid bonding, and chip-on-board (COB). Additionally, various materials, technologies, and design approaches may be used throughout the HI process. Advanced packaging techniques may be used to create packages that outperform traditional packaging methods in terms of performance, functionality, and reliability. Advanced packaging techniques may also enable the development of smaller, faster, and more complex electronic devices capable of performing a wide range of functions in various applications by combining the strengths of different semiconductor technologies, such as complementary metal-oxide-semiconductor (CMOS), micro-electro-mechanical systems (MEMS), and radio-frequency (RF) CMOS. Using advanced packaging technologies, multiple components, such as microprocessors, memory, sensors, and power management, may be integrated at various scales. However, advanced packaging techniques may pose manufacturing, design, and failure isolation challenges that may necessitate advanced inspection methods to assure high-quality and reliable systems. Indeed, the advancements in advanced IC packaging have brought increased complexity and diversity in packaging structures, which may pose challenges for physical inspection during failure analysis or hardware assurance.

Figure 4:
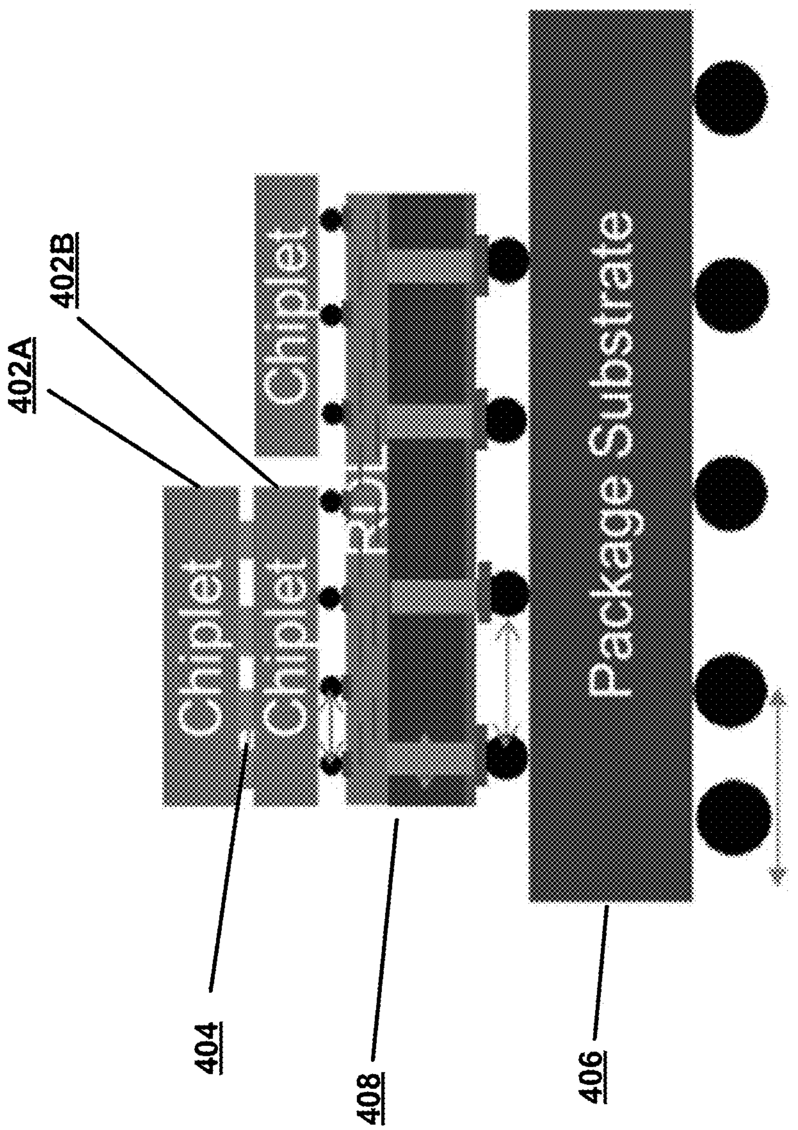
FIG. 4 is a diagram of an example of 2.5D integration packaging.

FIG. 4 is a diagram of an example 2.5D advanced IC package. 2.5D integration may comprise vertically stacking multiple dies or individual semiconductor components, such as chiplet 402A and chiplet 402B, with interconnects 404 (e.g., wires or vias) that run between the dies or semiconductor components to allow communication. Stacked dies may be mounted on a package substrate 406, which may provide additional functionality such as power management or signal conditioning. Generally, interconnects between multiple chips or dies in 2.5D integration may be on the scale of micrometers to millimeters in length and breadth. An interposer layer 408 may provide electrical connections between the chiplet 402A and chiplet 402B and may be tens to hundreds of micrometers thick. In some embodiments, TSVs that may also be used to connect the chiplet 402A and chiplet 402B may vary in size and pitch but in the order of micrometers.

3D integration may comprise stacking multiple dies horizontally and vertically to create a 3D structure. TSVs may run through the thickness of the dies while other interconnect technologies may be used to connect the dies. The dimensional scale of 3D integration might vary based on the technology used. In general, the diameters of the interconnects may range from tens of micrometers to a few nanometers. TSVs used in 3D integration, for example, may have widths ranging from a few micrometers to less than 100 nm, with pitches ranging from a few micrometers to less than 100 μm. Similarly, the thicknesses and widths of the interconnect utilized in 3D integration may range from several micrometers to a few hundred nanometers.

SiP may comprise a packaging strategy that combines multiple functional blocks or components (such as a microprocessor, memory, and power management) into a single package. The components may be stacked, placed side by side, or arranged appropriately for the application. The dimensional scale of SIP may vary significantly based on design and application requirements. SIP often combines numerous chips or dies into a single package, with interconnects supplying electrical connections between the various components. Depending on the size of the chips, the number of connections required, and the overall size of the package, the interconnects may range from a very small pitch (less than 50 microns) to a larger pitch (more than 100 microns). The interconnect thickness may also vary depending on the technology utilized, with some packages using thin-film interconnects and others using wire bonding or flip-chip bonding techniques.

COB may comprise directly mounting a bare semiconductor die onto a PCB or substrate without using an intervening package. The semiconductor die may be wire-bonded to the PCB to prevent damage and protected with a protective coating. COB interconnects may range in size from roughly 10 micrometers to several millimeters. The specific application and the size of the chip that is connecting to the substrate may determine the dimensions of interconnects. Interconnects in COB may be larger than those used in 2.5D and 3D integration because COB interconnects are frequently utilized for high-power applications that require larger interconnects to accommodate higher current flow.

Fan-out wafer-level packaging (FOWLP) may comprise redistributing a semiconductor die's inputs and outputs across a larger area, allowing for more wafer components to be placed on a single board. Depending on the application and components' size, FOWLP interconnects may range from a few micrometers to tens of micrometers. The pitch or distance between the interconnects may also vary greatly based on the package design's specific requirements. FOWLP interconnects may be smaller than those used in other packaging methods, allowing for better component density in each area and more sophisticated system designs, which may be used in applications that require a high level of integration, such as mobile devices.

Figure 5:
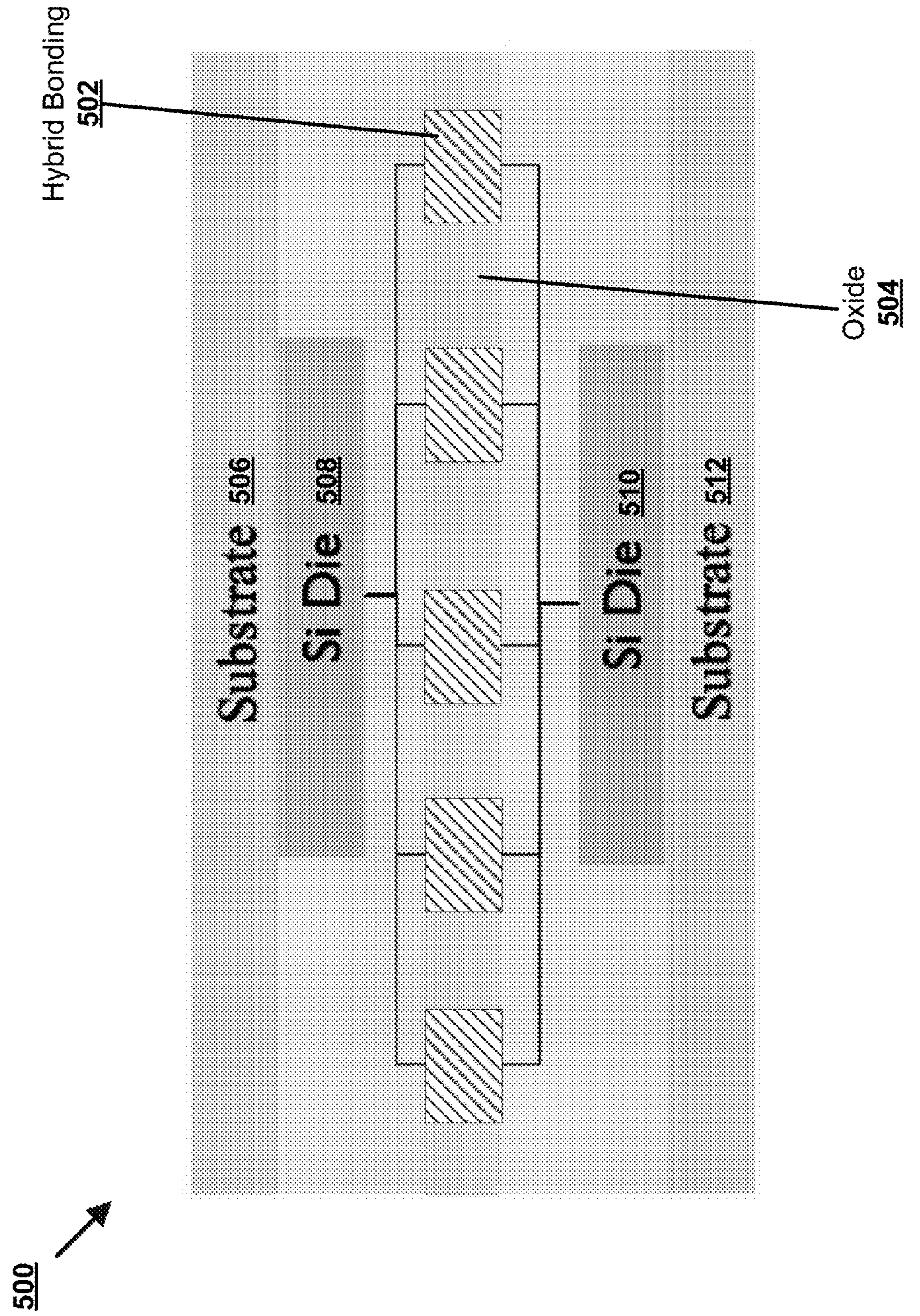
FIG. 5 is a diagram of an example 3D HI package.

FIG. 5 is a diagram of an example 3D HI package 500. The 3D HI package 500 may comprise coupling a first silicon (Si) die 508, that is deposited on a first substrate 506, to a second Si die 510, that is deposited on a second substrate 512, via hybrid bonding 502 within oxide 504. Hybrid bonding may be used in HI packaging to directly link two distinct semiconductor wafers (e.g., first Si die 508 and second Si die 510) together at the atomic level, as depicted in FIG. 5. The use of hybrid bonding 502 may comprise cleaning and prepping semiconductor wafers, bringing the wafers into proximity, and bonding the wafers at low temperatures in a vacuum. Hybrid bonding 502 may be used to create a solid and direct link between semiconductor wafers (such as Si die 508 and Si die 510), allowing the integration of diverse components from different semiconductor technologies or material systems into a single package or module. The hybrid bonding 502 may comprise interconnects with a dimensional scale of less than 1 μm to allow for the direct bonding of two surfaces at the nanoscale level, creating a high-density interconnect.

Generally, hybrid bonding may provide high-density interconnects, reduce package size and weight and enable the fabrication of 3D integrated systems. However, hybrid bonding may also present obstacles, such as alignment, precise control during the bonding process, and a necessity to manage material property variances. Despite these obstacles, hybrid bonding may be a promising technology for HI packaging, with the potential for high levels of integration and performance.

With the increasing complexity of advanced packaging, advanced physical inspection procedures have become crucial and may be needed to ensure the production of high-quality and reliable products. However, existing physical inspection techniques used in packaging detection may have certain limitations in terms of accuracy, particularly at the sub-micrometer and nanometer scales, as well as efficiency, such as fast and large area detection. For example, the challenges arising from small feature sizes are evident in the inspection of surface aspects of HI components and packages. Optical inspection techniques, such as microscopy and imaging, are commonly employed for surface inspection. For components at the micrometer level, high-resolution microscopes may be required, which have limited inspection window sizes and efficiency.

A tradeoff between accuracy and efficiency in optical inspection methods may restrict the ability of the optical inspection methods in detecting advanced packaging surface features effectively. X-ray inspection and scanning acoustic microscopy (SAM) are examples of internal component inspection methods that are commonly utilized. X-ray inspection may enable the examination of an internal structure of HI packages and components for identifying internal defects, such as voids, cracks, and misalignments. SAM may comprise a non-destructive inspection technology that employs sound waves to examine the internal structure of HI components and packages to detect faults, such as delamination, cracks, and voids. However, as the size of advanced IC packaging decreases and becomes more complex, non-destructive volumetric inspection methods face challenges in terms of accuracy and efficiency. These challenges arise due to the intricate nature of advanced IC packaging and the need to capture detailed information accurately.

For example, the multi-layer structure in advanced IC packaging poses challenges for in-depth volumetric inspection. An advanced IC package may comprise multiple layers of fine metal wires, polymer materials, and semiconductor layers. As signals travel through the layers during inspection, the layers may experience absorption, diffraction, attenuation, and other effects, leading to a decrease in signal-to-noise ratio. This, in turn, may impact the resolution of inspection methods when detecting small-sized features within advanced IC packaging. The multi-layer structure presents an additional complexity that may need to be considered when conducting inspections.

Example System Operations

Various embodiments of the present disclosure describe steps, operations, processes, methods, functions, and/or the like for determining compatibility of one or more IC packages with X-ray inspection by generating an X-ray compatibility metric. In some embodiments, generating the X-ray compatibility metric may comprise a systematic analysis of IC packaging specifications and X-ray imaging parameters. IC packaging specifications may comprise a set of package design parameters hereinafter referred to as design-for-inspection (DFI) parameters. DFI parameters may include, but are not limited to, bump-to-bump pitch, distance between bumps and RDLs, inter-RDL separation, and through silicon via (TSV) pitch. Examples of DFI parameters are listed in Table 1.

TABLE 1

| Notation | DFI Parameter |
|---|---|
| $P_b$ | Bump Pitch |
| $S_{br}$ | Bump-RDL Spacing |
| $S_{rr}$ | RDL-RDL Spacing |
| $P_i$ | Interconnect Spacing |
| $S_{rt}$ | RDL-TSV Spacing |
| $P_t$ | TSV Pitch |

Figure 6A:
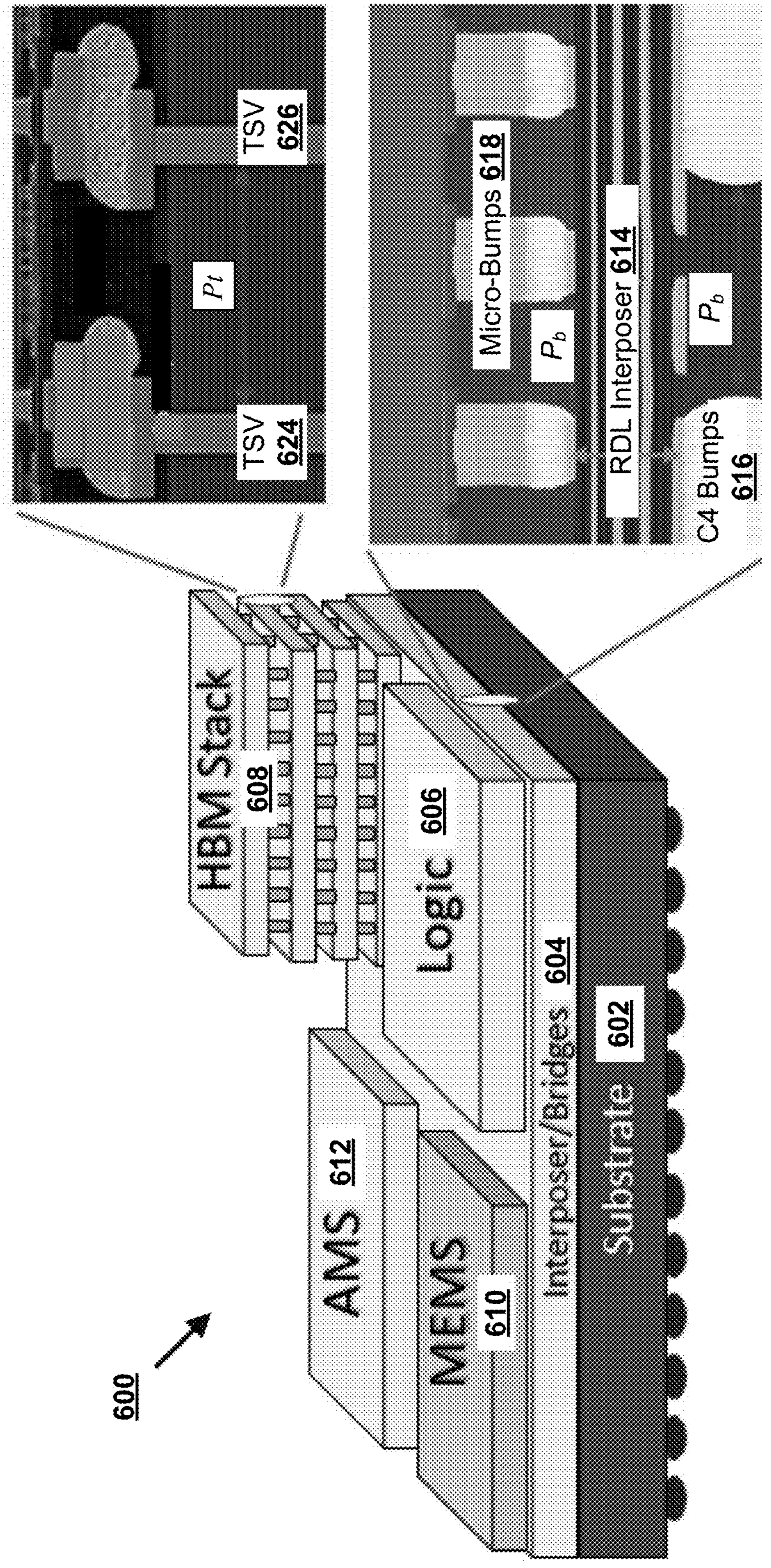
FIGS. 6A, 6B, and 6C illustrate cross-sectional views of a heterogenous advance package.
Figure 6B:
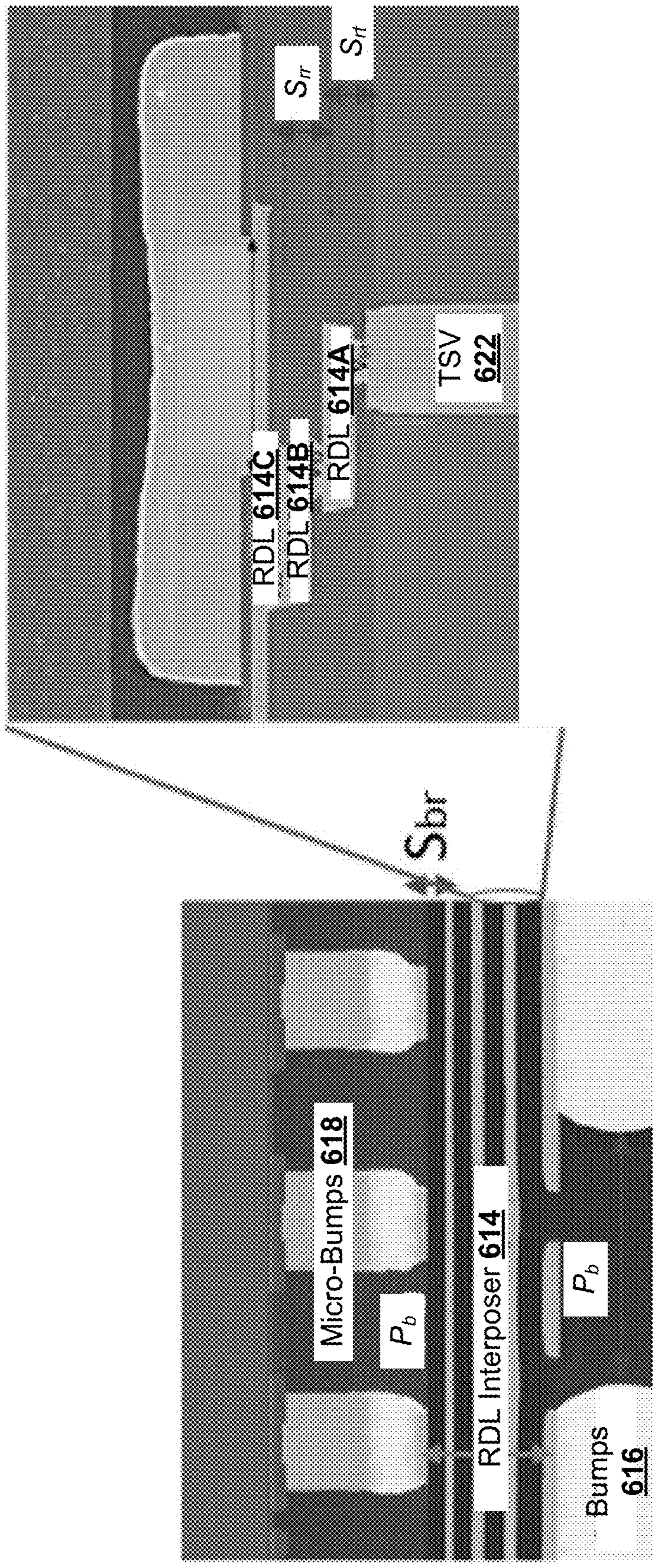
Figure 6C:
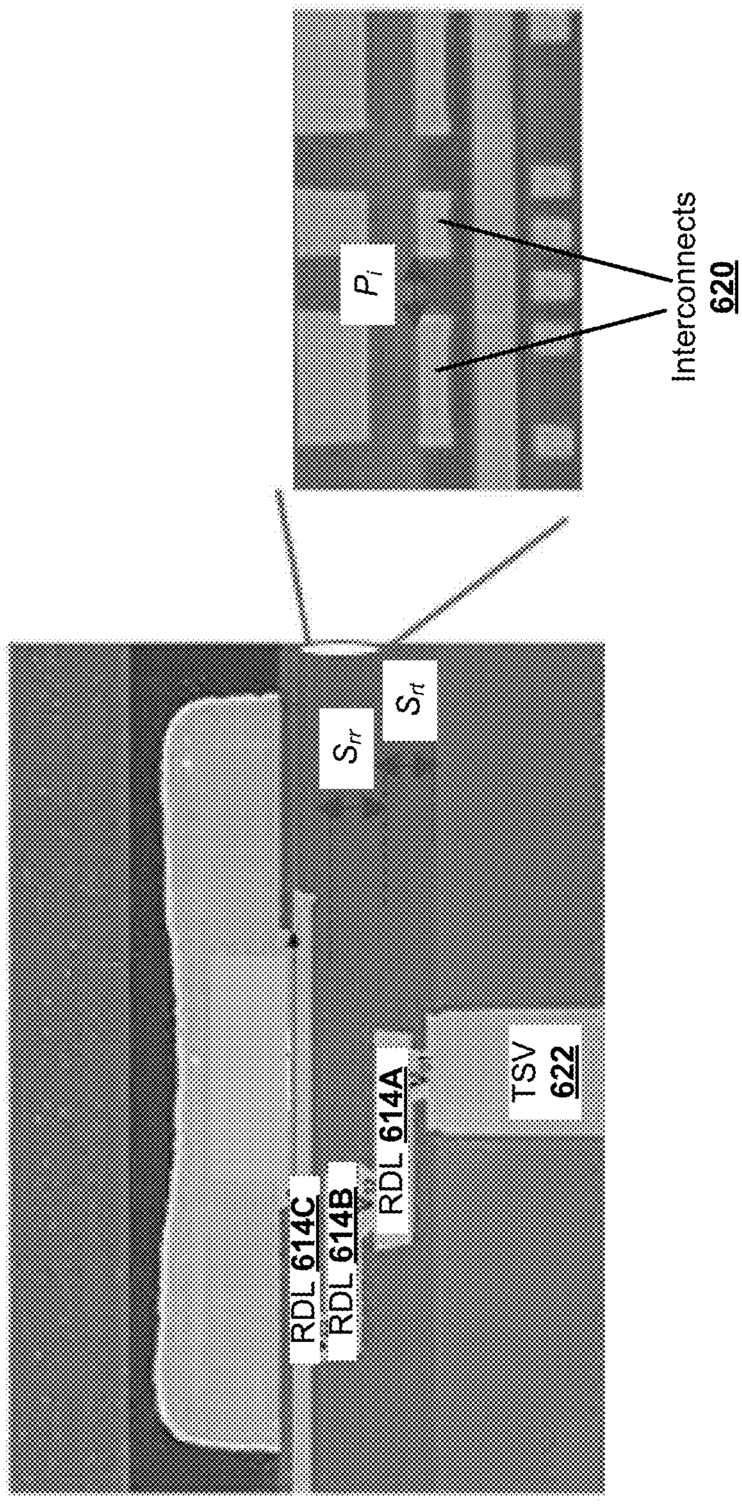

FIG. 6A through FIG. 6C are cross-sectional views of a heterogenous advance package 600. The heterogenous advance package 600 comprises logic 606, high bandwidth memory (HBM) stack 608, micro-electro-mechanical system (MEMS) 610, and advanced memory system (AMS) 612 that are coupled to interposer/bridges 604. The interposer/bridges 604 may be further deposited on substrate 602.

As depicted in FIG. 6A, a bump pitch $P_b$ may represent bump-to-bump pitch between C4 bumps 616 or micro-bumps 618. TSV pitch $P_t$ may represent TSV-to-TSV (e.g., between TSV 624 and TSV 626) pitch, as depicted with reference to the HBM stack 608.

Referring now to FIG. 6B, bump-RDL spacing $S_{br}$ may represent a distance or spacing between bumps C4 616 or micro-bumps 618 and RDL interposer 614, as depicted in FIG. 6B. RDL-RDL spacing $S_{rr}$ may represent inter-RDL separation or spacing between RDLs (e.g., RDL 614A, RDL 614B, and RDL 614C). RDL-TSV spacing $S_{rt}$ may represent a distance or spacing between RDLs (e.g., RDL 614A, RDL 614B, and RDL 614C) and TSVs (e.g., TSV 622).

Referring now to FIG. 6C, interconnect spacing $P_i$ may represent a distance or spacing between interconnects 610.

In some embodiments, specific DFI parameters are considered depending on a specific packaging technology of an IC design being analyzed. DFI parameters may comprise key factors that affect X-ray imaging discernability. The X-ray imaging parameters may comprise various X-ray imaging specifications, such as resolution and other imaging and reconstruction parameters. X-ray imaging parameters may define capabilities and limitations of an X-ray inspection system being used.

To generate an X-ray compatibility metric, an analysis associated with a collection of IC samples that are associated with a target packaging design may be performed. The IC samples may represent a range of chip designs with varying DFI parameter values. For each sample, X-ray images may be acquired and analyzed for visibility and distinguishability of fine-pitched features. Through such analysis, critical thresholds for DFI parameters may be identified, which may be representative of minimum values required to ensure adequate discernability through X-ray inspection. In some embodiments, the critical thresholds are determined based on visibility and distinguishability levels necessary for reliable detection and assessment of fine-pitched features. A test IC package design may be evaluated based on how many and to what extent DFI parameters of the test IC package design conform to DFI thresholds that are identified for a given package type associated with the test IC package design. A numerical value may be determined based on the evaluation of the test IC package design to represent the extent of X-ray inspection compatibility of the test IC package design, or in other words, an X-ray compatibility metric that quantifies the compatibility of the test IC package design with X-ray inspection.

Figure 7:
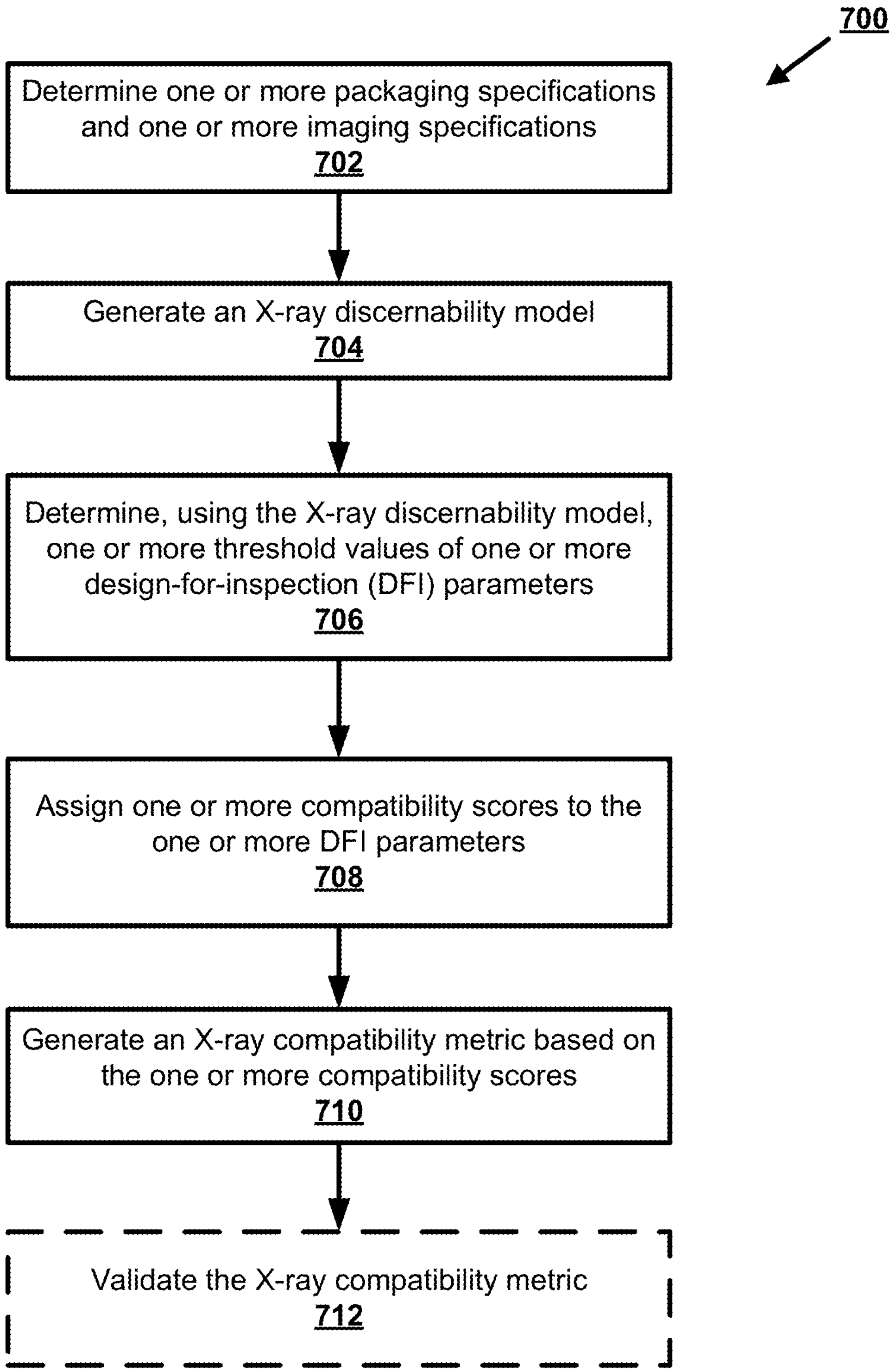
FIG. 7 illustrates a flowchart of a method for determining compatibility of integrated circuit packages with X-ray inspection in accordance with some embodiments discussed herein.

FIG. 7 presents a flowchart of a process for determining compatibility of IC packages with X-ray inspection according to some embodiments of the present disclosure. The process 700 includes example operations that may be performed by the circuit design analysis computing entity 106, and the circuit design analysis computing entity 106 comprises means, such as processing element 205, non-volatile storage or memory media 210, volatile storage or memory media 215, one or more network interfaces 220, and/or the like, for performing the example operations.

In some embodiments, the process 700 begins at step/operation 702 when the circuit design analysis computing entity 106 determines one or more packaging specifications and one or more imaging specifications for a target IC package type. The one or more packaging specifications may comprise one or more DFI parameters that may be varied to improve X-ray compatibility of an IC package design. In some embodiments, a DFI parameter may be associated with or comprise a packaging configuration that affects the discernability of fine-pitched features during X-ray inspection. In some embodiments, the one or more DFI parameters may comprise dimensions and spacings between different structures in an IC package, such as micro-bumps, RDLs, metal interconnects and TSVs (e.g., DFI parameters listed in Table 1). The one or more DFI parameters may comprise key factors that affect X-ray imaging discernability. For example, pitches and spacings between certain structures that are too small may lead to overlapping of wires, making it difficult to distinguish between them on X-ray images. On the other hand, larger pitches and spacings may result in higher X-ray transparency and better image quality.

The one or more packaging specifications may also comprise material composition and geometry of features associated with packages, which may affect X-ray attenuation and noise scattering. In some embodiments, one or more packaging specifications that are determined for a particular package type may vary depending on an architecture of a packaging technology used. For example, one or more packaging specifications determined for chip-on-wafer-on-substrate (CoWoS) technology may comprise DFI parameters along with other system parameters, such as material composition m of different structures in the package, as well as their geometries g. The one or more packaging specifications may be determined based on a noise scattering pattern that is expected to be observed when X-ray radiation is passed through an IC package.

In some embodiments, the one or more imaging specifications may comprise resolution r of a selected imaging system. The resolution r may directly impact the ability to detect defects within IC packages being examined. Higher resolution X-ray machines may capture finer details, and as such, DFI parameter thresholds may depend on the resolution capability of an imaging system being used. In some embodiments, the one or more imaging specifications may further comprise X-ray energy, detector specifications, and sample orientation.

In some embodiments, at step 704, the circuit design analysis computing entity 106 generates an X-ray discernability model based on a combination of one or more X-ray image samples and one or more X-ray simulations. The X-ray discernability model may comprise a model of ideal design specifications that conform with given X-ray discernability requirements. The one or more X-ray image samples may comprise X-ray images of physical samples comprising the target IC package type using 3D X-ray tomography or laminography. In some embodiments, the one or more X-ray image samples may comprise a variety of packaging specifications (e.g., DFI parameters). In some embodiments, the X-ray discernability model may comprise a predictive machine learning model that is trained (e.g., generate one or more parameters) with a training dataset based on the combination of one or more X-ray image samples and one or more X-ray simulations to generate thresholds for DFI parameters of the target IC package type. In some embodiments, generating the X-ray discernability model may comprise gathering and analyzing X-ray image samples of sample IC packages in combination with Monte Carlo simulations that predict X-ray activity. In some embodiments, the one or more X-ray simulations may comprise interactions of X-rays with 3D (e.g., a computer-aided design (CAD)) models of the sample IC packages (associated with the one or more X-ray image samples) within a simulation environment.

Figure 8:
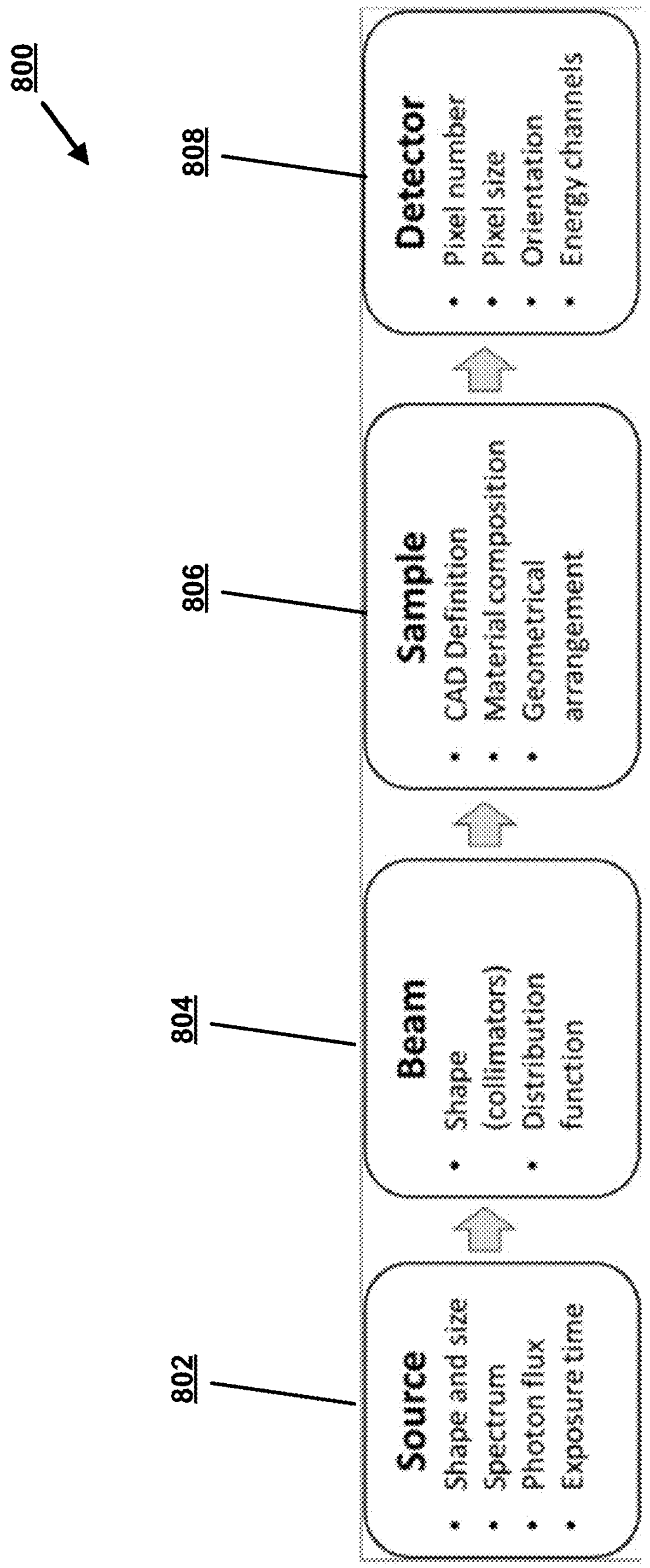
FIG. 8 presents a flowchart of an example process for configuring a simulation environment for X-ray interaction in accordance with some embodiments discussed herein.

FIG. 8 depicts presents a flowchart of an example process 800 for configuring a simulation environment for X-ray interaction. The process 800 includes example operations that may be performed by the circuit design analysis computing entity 106. In some embodiments, the simulation environment may be configured to observe how X-ray radiation interacts with a 3D model of a sample IC package.

In some embodiments, the process 800 begins at step/operation 802 when the circuit design analysis computing entity 106 configures one or more source parameters. The one or more source parameters may be associated with (i) shape and size, (ii) spectrum, (iii) photon flux, or (iv) exposure time.

In some embodiments, at step 804, the circuit design analysis computing entity 106 configures one or more beam parameters. The one or more beam parameters may be associated with (i) shape (e.g., collimators) or (ii) distribution function.

In some embodiments, at step 806, the circuit design analysis computing entity 106 configures one or more sample parameters. The one or more sample parameters may be associated with (i) computer-assisted design (CAD) definition, (ii) material composition, or (iii) geometrical arrangement.

In some embodiments, at step 808, the circuit design analysis computing entity 106 configures one or more detector parameters. The one or more detector parameters may be associated with (i) pixel number, (ii) pixel size, (iii) orientation, or (iv) energy channels.

Accordingly, an X-ray discernability model may be generated based on the discernability of features determined from the one or more X-ray image samples along with simulation results from modeling X-ray interactions with 3D models of the sample IC packages. Analyzing the one or more X-ray image samples with 3D model simulations may help identify noise scattering sources and limits on different feature dimensions and proximity between different features, which may be factored into the X-ray discernability model for determining thresholds of DFI parameters of the target IC package type.

Referring back to FIG. 7, in some embodiments, at step 706, the circuit design analysis computing entity 106 determines, using the X-ray discernability model, one or more threshold values of one or more DFI parameters that are associated with the target IC package type. The one or more threshold values may also be determined based on industry standards, design specifications, manufacturing capabilities, and the one or more imaging specifications. The one or more threshold values may serve as benchmarks to assess compatibility of a system based on the target IC package type.

In some embodiments, at step 708, the circuit design analysis computing entity 106 assigns one or more compatibility scores to the one or more DFI parameters. The one or more compatibility scores may be assigned based on a comparison between one or more test DFI parameter values that are associated with a test IC package design and the one or more threshold values. The test IC package design may comprise the target IC package type. The one or more test DFI parameter values may be analyzed to determine compliance to the one or more threshold values. In some embodiments, the one or more compatibility scores are assigned to the one or more DFI parameters based on a degree of compliance to the one or more threshold values (of the one or more DFI parameters) by the one or more test DFI parameter values. In some embodiments, assigning the one or more compatibility scores comprises assigning weights to one or more DFI parameters based on their importance or impact on the test IC package design's functionality.

A set of DFI parameters to be considered for a given package architecture (e.g., target IC package type) may be notated as $P_{DFI}$. For example, $P_{DFI}=[P_b, S_{br}, S_{rr}, P_i, S_{rt}, P_t]$ based on the DFI parameters listed in Table 1. Each element in the set may represent a DFI parameter threshold value. Factors such as feature geometry g, material composition m, and imaging resolution r may directly impact the DFI parameter thresholds. As such, $P_{DFI}$ may be expressed as a function of these factors. The relation may be generalized by the following expression:

$$P_{DFI} = \{P_1, P_2, P_3, P_4, \ldots P_n\} = f(m, g, r) \qquad \text{Equation 1}$$

$P_{DFI}$ comprises a set of threshold values for the DFI parameters $P_1, P_2, P_3, P_4, \ldots, P_n$, where $P_n$ may represent a threshold value for the $n^{th}$ DFI parameter. The function $f$ (m,g,r) may represent a function of system parameters comprising feature geometry g, material composition m, and imaging resolution r.

A set of test DFI parameter values of a test IC package design to be evaluated for X-ray compatibility may be represented as $T_1, T_2, T_3, \ldots T_n$. The extent of compliance of a given test DFI parameter may be expressed as a compatibility score associated with the given DFI parameter. Therefore, a compatibility score $C_n$ of the $n^{th}$ DFI parameter ($P_n$) may be expressed as:

$$C_n = \frac{2}{\pi} \cdot \arctan\left(\pi \cdot \left(\frac{T_n}{P_n} - 1\right)\right) \qquad \text{Equation 2}$$

Figure 9:
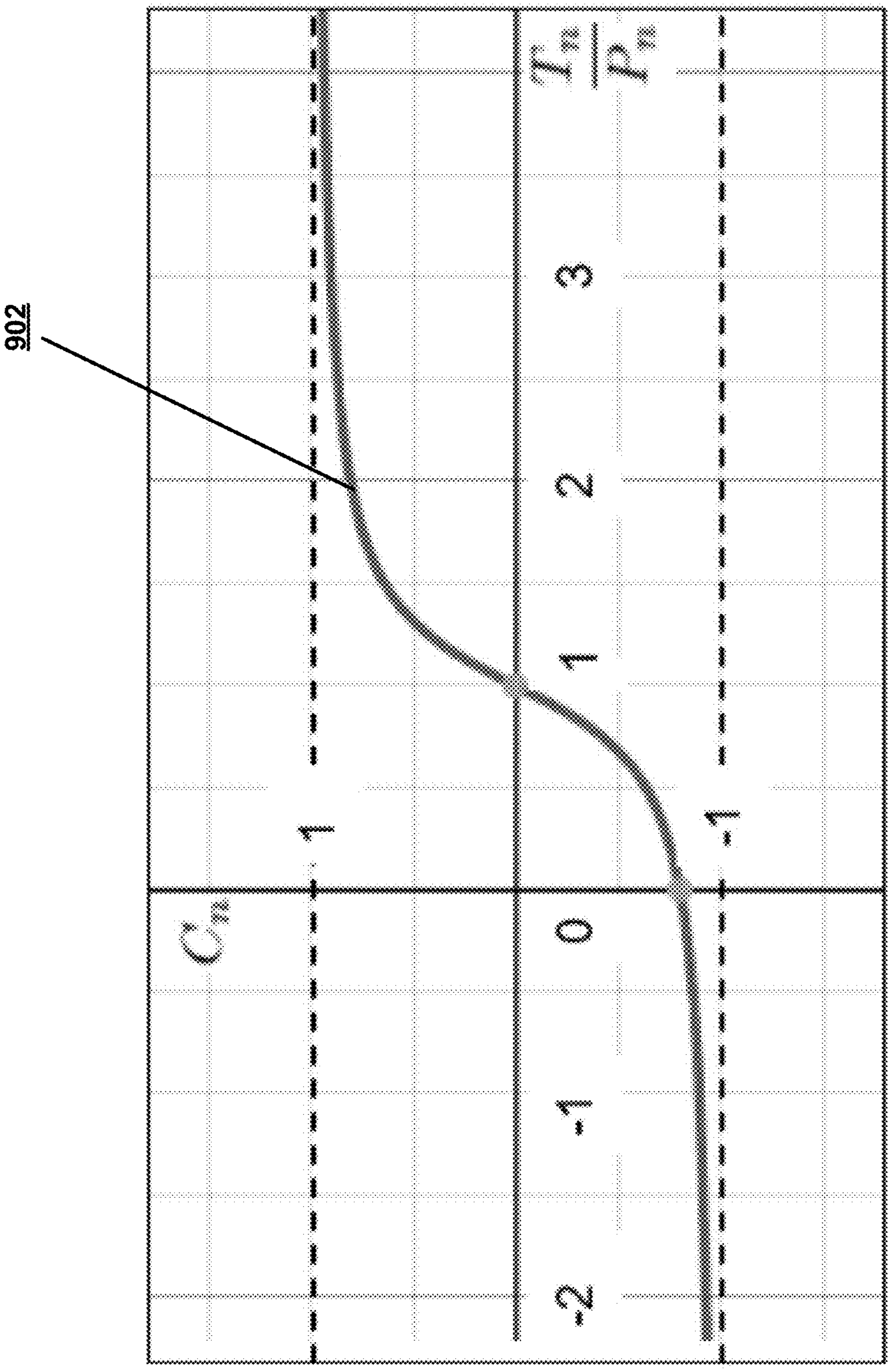
FIG. 9 depicts an example plot of compatibility score of a design-for-inspection (DFI) parameter as a function of test value to threshold value ration.

The above Equation 2 expresses the distribution of the compatibility score of each DFI parameter as an inverse tangent function, with −1 and 1 as higher and lower bounds respectively, as depicted in FIG. 9. FIG. 9 presents an example plot of compatibility score function 902 of a DFI parameter as a function of test value to threshold value ration. The closer the compatibility score function 902 ($C_n$) is to the higher bound 1, the more compatible the DFI parameter value of a test design is. Conversely, the closer the compatibility score function 902 is to the lower bound −1, the less compatible the DFI parameter value of the test design is.

Referring back to FIG. 7, in some embodiments, at step 710, the circuit design analysis computing entity 106 generates an X-ray compatibility metric based on the one or more compatibility scores. The X-ray compatibility metric may comprise a measurement that represents an overall compatibly assessment of the test IC package design (and by extension the target IC package type) with respect to advanced X-ray inspections. In particular, the X-ray compatibility metric may be associated with a discernability of fine-pitched features in chip packages during X-ray inspection and provide an indication of suitability for further production or usage. In some embodiments, the X-ray compatibility metric comprises a combination of the one or more compatibility scores assigned to the one or more DFI parameters.

According to various embodiments of the present disclosure, an X-Ray compatibility metric, denoted by $CM_{X\text{-}Ray}$, comprises a weighted average sum of the compatibility scores of the elements in $P_{DFI}$, as expressed in the following:

$$CM_{X\text{-}Ray} = \sum_{k=0}^{n} \left( W_k \cdot \frac{T_k}{P_k} \right), \qquad \text{Equation 3}$$

$$\text{where } \sum_{k=0}^{n} W_k = 1 \text{ and } 0 \le W_k \le 1$$

In the above Equation 3, $W_k$ may represent the weight of the $k^{th}$ DFI parameter. $CM_{X\text{-}Ray}$ may have a value between 0 and 1, inclusive. Higher values of $CM_{X\text{-}Ray}$ may represent high compatibility with X-ray imaging, less susceptibility to noise interference, and/or less presence of unresolvable features.

In some embodiments, at optional step 712, the circuit design analysis computing entity 106 validates the X-ray compatibility metric. The X-ray compatibility metric may be validated by comparing values using the X-ray compatibility metric with known good and known bad samples or through correlation with established industry standards. In some embodiments, the X-ray compatibility metric may be refined as necessary based on validation feedback and/or practical application.

Accordingly, the X-ray compatibility metric may be integrated into existing chip design and simulation workflow, allowing chip designers to optimize IC designs for enhanced discernability of fine-pitched features and to make informed decisions regarding X-ray inspection feasibility.

Figure 10:
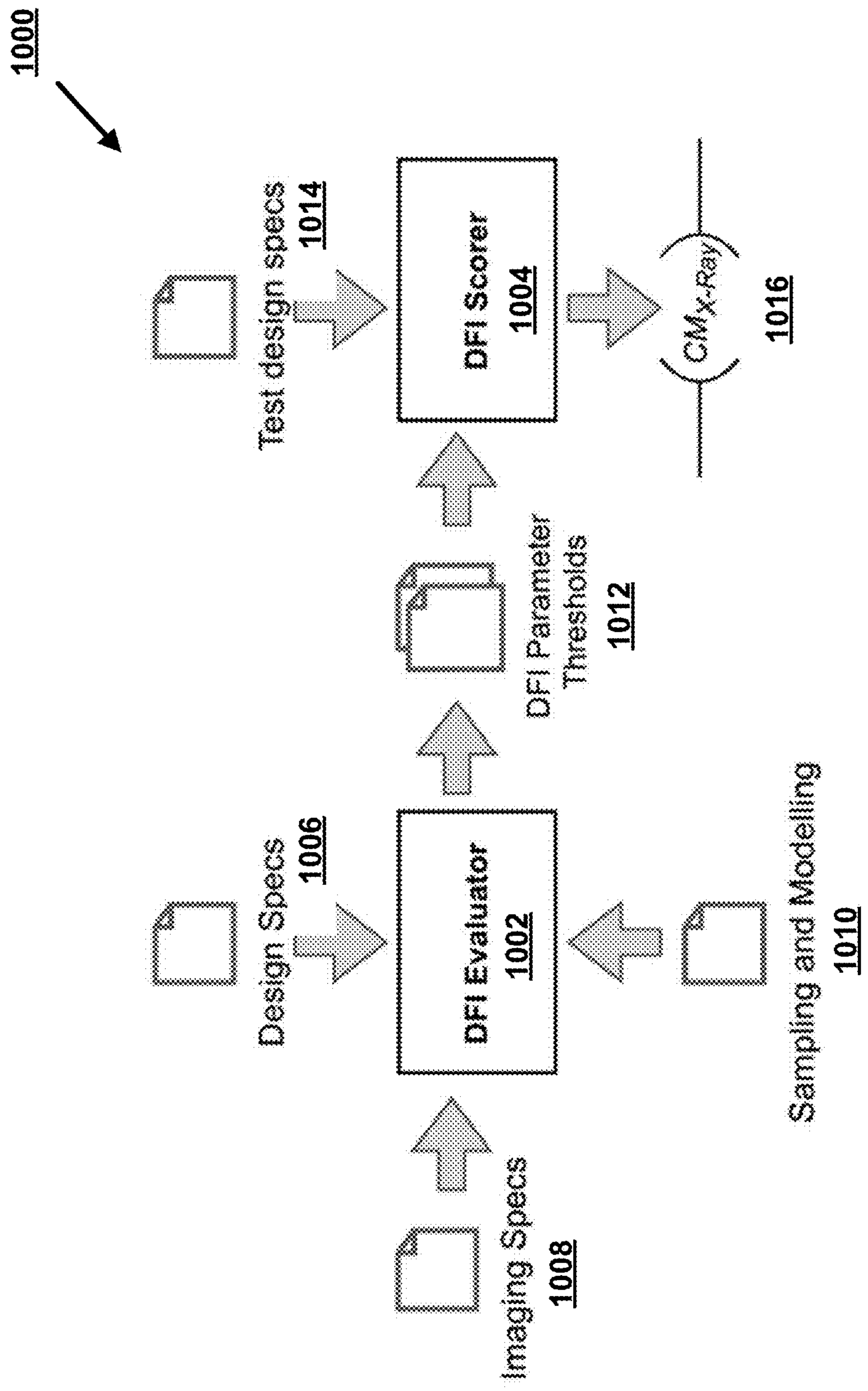
FIG. 10 illustrates an example architecture of an X-ray compatibility metric framework.

FIG. 10 depicts an example architecture of an X-ray compatibility metric framework. The DFI evaluator 1002 may be configured to determine DFI parameters for various IC package types and generate threshold levels (DFI parameter thresholds 1012) for the DFI parameters. The DFI evaluator 1002 receives inputs comprising design specifications 1006, imaging specifications 1008, and sampling and modelling and sampling 1010. DFI parameter thresholds 1012 from DFI evaluator 1002 are transferred or transmitted to DFI scorer 1004.

DFI scorer 1004 may be configured to determine a $CM_{X\text{-}Ray}$ score 1016 for a test IC design based on DFI parameter thresholds 1012 for an IC package type associated with the test design specifications 1014 of the test IC design. Test design specifications 1014 may comprise specifications of DFI parameters of the test IC design. $CM_{X\text{-}Ray}$ score 1016 may comprise a quantified measure of how compatible the test IC design will be to inspection using X-ray imaging once the test IC design is fabricated. The $CM_{X\text{-}Ray}$ score 1016 may be determined based on an extent of compliance of the DFI parameters of the test IC design with their respective maximum thresholds set by the DFI evaluator 1002.

CONCLUSION

It should be understood that the examples and embodiments described herein are for illustrative purposes only and that various modifications or changes in light thereof will be suggested to persons skilled in the art and are to be included within the spirit and purview of this application.

Many modifications and other embodiments of the present disclosure set forth herein will come to mind to one skilled in the art to which the present disclosures pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

The invention claimed is:

1. A method comprising:

determining, by one or more processors, one or more packaging specifications and one or more imaging specifications;

generating, by the one or more processors, an X-ray discernability model based on one or more X-ray image samples and one or more X-ray simulations, wherein the one or more X-ray image samples comprise a target IC package type and the one or more packaging specifications;

determining, by the one or more processors and using the X-ray discernability model based on the one or more imaging specifications, a set of one or more threshold values that corresponds to a set of one or more design-for-inspection (DFI) parameters for the target IC package type;

determining, by the one or more processors, a set of one or more compatibility scores that corresponds to a set of one or more test DFI parameter values of a test IC package design based on a comparison between the set of one or more test DFI parameter values and the set of one or more threshold values, wherein (a) the set of one or more test DFI parameter values corresponds to the set of one or more DFI parameters and (b) a compatibility score of the set of one or more compatibility scores corresponds to an extent of X-ray compatibility of the test IC package design in accordance with a DFI parameter of the set of one or more DFI parameters; and generating, by the one or more processors, an X-ray compatibility metric that corresponds to the test IC package design based on the set of one or more compatibility scores.

2. The method of claim 1, wherein the X-ray compatibility metric is associated with a discernability of fine-pitched features in chip packages during X-ray inspection.

3. The method of claim 1, wherein the one or more packaging specifications and the one or more imaging specifications comprise material composition, X-ray energy, detector specifications, sample orientation, and packaging configurations.

4. The method of claim 1, wherein the set of one or more DFI parameters represent parameters affecting discernability of fine-pitched features in chip packages during X-ray inspection.

5. The method of claim 1, wherein the X-ray compatibility metric is usable for (i) integration with an integrated chip (IC) chip design and simulation workflow or (ii) optimizing the IC chip design for enhanced discernability of fine-pitched features associated with X-ray inspection feasibility.

6. The method of claim 1, wherein the one or more packaging specifications are associated with the target IC package type.

7. The method of claim 1, wherein the set of one or more DFI parameters define dimensions and spacings between a plurality of structures in an IC package.

8. The method of claim 7, wherein the plurality of structures comprises micro-bumps, redistribution layers, metal interconnects, or through-silicon vias.

9. The method of claim 1, wherein generating the X-ray discernability model comprises gathering and analyzing (a) the one or more X-ray image samples comprising one or more sample IC packages and (b) the one or more X-ray simulations associated with the one or more sample IC packages.

10. The method of claim 9, wherein the one or more X-ray simulations comprise interactions of X-rays with a 3D model of the one or more sample IC packages within a simulation environment.

11. The method of claim 1, wherein the test IC package design comprises the target IC package type.

12. The method of claim 1 further comprising assigning the set of one or more compatibility scores to the set of one or more DFI parameters based on a degree of compliance to the set of one or more threshold values by the set of one or more test DFI parameter values.

13. The method of claim 1, wherein the X-ray compatibility metric comprises a weighted average sum of the set of one or more compatibility scores.

14. A computing system comprising memory and one or more processors communicatively coupled to the memory, the one or more processors configured to:

determine one or more packaging specifications and one or more imaging specifications;

generate an X-ray discernability model based on one or more X-ray image samples and one or more X-ray simulations, wherein the one or more X-ray image samples comprise a target IC package type and the one or more packaging specifications;

determine, using the X-ray discernability model and based on the one or more imaging specifications, a set of one or more threshold values that corresponds to a set of one or more design-for-inspection (DFI) parameters for the target IC package type;

determine a set of one or more compatibility scores that corresponds to a set of one or more test DFI parameter values of a test IC package design based on a comparison between the set of one or more test DFI parameter values and the set of one or more threshold values, wherein (a) the set of one or more test DFI parameter values corresponds to the set of one or more DFI parameters and (b) a compatibility score of the set of one or more compatibility scores corresponds to an extent of X-ray compatibility of the test IC package design in accordance with a DFI parameter of the set of one or more DFI parameters; and generate an X-ray compatibility metric that corresponds to the test IC package design based on the set of one or more compatibility scores.

15. The computing system of claim 14, wherein the one or more packaging specifications and the one or more imaging specifications comprise material composition, X-ray energy, detector specifications, sample orientation, and packaging configurations.

16. The computing system of claim 14, wherein the set of one or more DFI parameters represent parameters affecting discernability of fine-pitched features in chip packages during X-ray inspection.

17. The computing system of claim 14, wherein the one or more packaging specifications are associated with the target IC package type.

18. The computing system of claim 14, wherein the set of one or more DFI parameters define dimensions and spacings between a plurality of structures in an IC package.

19. The computing system of claim 18, wherein the plurality of structures comprises micro-bumps, redistribution layers, metal interconnects, or through-silicon vias.

20. One or more non-transitory computer-readable storage media including instructions that, when executed by one or more processors, cause the one or more processors to:

determine one or more packaging specifications and one or more imaging specifications;

generate an X-ray discernability model based on one or more X-ray image samples and one or more X-ray simulations, wherein the one or more X-ray image samples comprise a target IC package type and the one or more packaging specifications;

determine, using the X-ray discernability model and based on the one or more imaging specifications, a set of one or more threshold values that corresponds to a set of one or more design-for-inspection (DFI) parameters for the target IC package type;

determine a set of one or more compatibility scores that corresponds to a set of one or more test DFI parameter values of a test IC package design based on a comparison between the set of one or more test DFI parameter values and the set of one or more threshold values, wherein (a) the set of one or more test DFI parameter values corresponds to the set of one or more DFI parameters and (b) a compatibility score of the set of one or more compatibility scores corresponds to an extent of X-ray compatibility of the test IC package design in accordance with a DFI parameter of the set of one or more DFI parameters; and generate an X-ray compatibility metric that corresponds to the test IC package design based on the set of one or more compatibility scores.

* * * * *